(No Model.)
F. D. SMITH.
METHOD OF AND APPARATUS FOR PRESERVING CONDENSED MILK.
No. 520,014. Patented May 15, 1894.
Fig. 1.
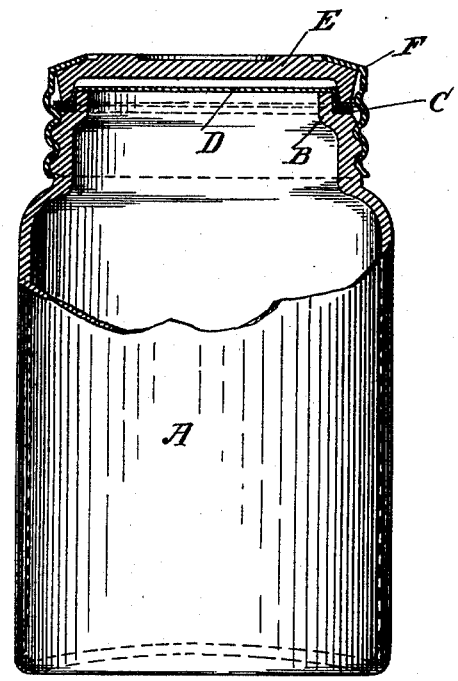
Fig. 2.
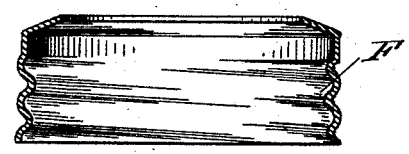
Fig. 3.
Fig. 4.
Fig. 5.
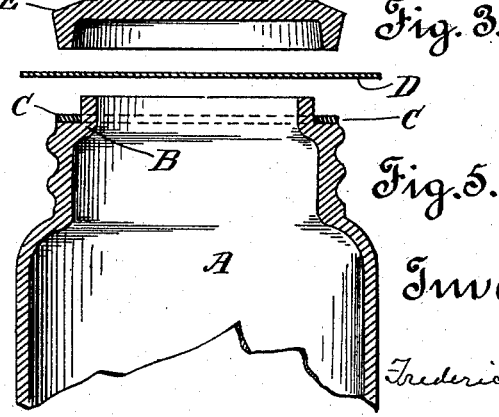
Witnesses.
F. E. Monteverde.
M. A. Wheaton.
Inventor.
Frederick Daniel Smith

UNITED STATES PATENT OFFICE.

FREDERICK DANIEL SMITH, OF SAN FRANCISCO, CALIFORNIA.

METHOD OF AND APPARATUS FOR PRESERVING CONDENSED MILK.

SPECIFICATION forming part of Letters Patent No. 520,014, dated May 15, 1894.

Application filed February 9, 1894. Serial No. 499,639. (No model.)

*To all whom it may concern:*

Be it known that I, FREDERICK DANIEL SMITH, of the city and county of San Francisco and State of California, have discovered and invented certain new and useful Improvements in Methods of and Apparatus for Preserving Condensed Milk; and I do hereby declare that the following is a full, clear, and exact description thereof, reference being had to the accompanying drawings, and to the letters of reference marked thereon, making a part of this specification.

Milk is condensed by first heating it to 212° for a few moments in order to destroy all unhealthy germs that may be in it. This is accomplished by driving steam directly into and through the milk. Sugar is then added to the milk to act as an assistant in preserving it. The milk with the sugar in it is then condensed by being boiled in a vacuum until the mass is about one-third of the volume of the original milk in its natural condition. This condensed milk has peculiar qualities which prevent its being placed in vessels for preservation and particularly in glass vessels in the same manner that jellies, fruits and other edibles are placed for preservation therein. I use practically the same kind of jars that have been heretofore used for the preservation of jellies, fruits and vegetables, but I make an addition thereto by inserting a diaphragm inside of the cover and over the condensed milk, and by making this addition I am able to place the condensed milk in the jars while in a cold condition, and at the same time secure it in an air tight compartment while there will be air within the jar. In putting jellies into jars for keeping it is not necessary or usual to have the air excluded from the jellies, yet this exclusion of the air from the condensed milk is absolutely necessary to its preservation. In putting fruits, vegetables and similar edibles into jars it is necessary that the air should be excluded from the edibles, and this exclusion of the air is secured by placing the edibles in the jars and heating them and sealing the covers on while the material is hot and fills the jar full. Then when the material cools and contracts something of a vacuum is left in the jar. In this heating operation it is practicable to entirely exclude the air from fruit and similar jars which could not be done without the heating process with any reasonable degree of economy, if at all.

In my invention, I place the condensed milk in the jars while it is cold, and I do not entirely exclude the air from the jar, but I do exclude it entirely from the condensed milk. In this respect my method of placing condensed milk in jars for preservation differs from any method heretofore used for putting edibles of any kind into jars for preservation.

In the drawings Figure 1, represents in elevation a glass jar A, with its upper part broken away so as to show in cross section the annular shoulder B, which goes around the neck of the jar; also the gasket or ring C, which is made of rubber or other similar yielding material and is placed upon the shoulder B; also the diaphragm D, the cover E which is preferably made of glass; and also the metal ring F. The metal ring reaches inward at the top so as to cover a portion of the cover and force it downward. This ring B, is also made in a screw form to fit the screw form of the neck of the jar. Such screw forms for the rings and necks of the jars are in common use, and are well understood. Fig. 2, represents the metal ring F. Fig. 3, represents the cover E, alone. Fig. 4, represents the diaphragm D, before it is placed upon the jar. Fig. 5, represents the top and neck of the jar with the gasket or yielding ring C, resting upon the shoulder B.

The diaphragm is made of any strong waxed, oiled, or greased paper, or any other material that is sufficiently strong and impervious to air, and sufficiently pliable for the purpose.

It is possible to dispense with the gasket C, by forcing the lower rim or flange of the cover E down upon the shoulder B, with an annular rim of the circumference of the diaphragm D interposed between them so as to have the three parts form an air tight joint.

In the operation of filling and sealing the jars of condensed milk, I first fill the jar full of the material. I next place the diaphragm on top of the material and jar taking care that no particle of air is left under the diaphragm. Then the cover is placed over the diaphragm and forced down until the bottom of its rim or flange forces the rim of the diaphragm down upon the shoulder B of the neck of the jar, either with or without the interposition of the gasket C. The metal rim F, is then placed in position and screwed down around the neck of the jar, forcing the parts together so that the joint between the cover and jar is made air tight. The jar is then ready for market.

In placing the cover upon the jar some portion of air will remain in the cover and will be interposed between its under surface and the upper surface of the diaphragm. This small amount of air will act as a cushion and will furnish sufficient elasticity to compensate for what expansion and contraction may occur in the contents of the jar from atmospheric changes of temperature, and thus avoid danger of the breaking of the jar on account of such changes of temperature.

I have discovered by actual practical trial that, by the use of the diaphragm as herein described, condensed milk can be placed in jars while it is in a cold condition, and that it will be preserved indefinitely therein perfectly sweet and pure. While the mechanical difference between my method of putting condensed milk in jars for preservation and the former methods of putting fruits and other edibles in jars for preservation is not very great the effects and results of the difference is very great and of vast importance. Sweetened condensed milk cannot be heated in the jars, as fruits and ordinary edibles are heated, while the jars are being sealed without injuring the condensed milk. Besides this fact, it is an obvious advantage in the use of glass jars to avoid the strain upon the jar from having a vacuum therein which must result when the filled jars are sealed with the contents in a heated condition.

Devices other than the metal screw rings herein described may be used for pressing and holding the vessels and their covers together.

Having thus described my invention, what I claim, and desire to secure by Letters Patent, is—

1. The method herein described of preserving condensed milk, consisting, essentially, in first filling a vessel or jar to its utmost capacity with the material while the latter is in a cold condition; then placing a diaphragm across the mouth of the vessel or jar with one side in contact with the material so as to exclude air from between the diaphragm and contents; then securing the edges of the diaphragm to form an air tight joint, and finally providing an air cushion above the diaphragm to compensate for whatever expansion or contraction may occur in the contents.

2. In a vessel or jar, a flexible diaphragm, impervious to the air, placed over the mouth of the vessel or jar so that it will rest upon the material to the exclusion of air between the two, and a cover over said diaphragm having a chamber or air space to compensate for the movement of the diaphragm due to the expansion or contraction of the contents of the vessel or jar, and having a rim or flange adapted to force the rim of the diaphragm into contact with a shoulder on the vessel or jar to form an air tight joint.

3. In vessels for holding preserved foods, and in combination with the body and chambered cover of such vessels, a flexible diaphragm, impervious to the air, confined between the cover and body of the vessel with one side in contact with the contents of the vessel, said diaphragm having its edges extended outwardly and confined between the cover and body portion to form an air tight joint.

FREDERICK DANIEL SMITH.

Witnesses:
M. A. WHEATON,
F. J. KIERCE.